United States Patent [19]
Meyer et al.

[11] 3,749,207
[45] July 31, 1973

[54] SEAT BRAKE WITH TOGGLE LINKAGE

[75] Inventors: Theodore R. Meyer, Lansing; Myron J. Boyajian, Homewood, all of Ill.

[73] Assignee: Allis-Chalmers Corporation, Milwaukee, Wis.

[22] Filed: Mar. 1, 1972

[21] Appl. No.: 230,778

[52] U.S. Cl............................... 188/109, 180/101
[51] Int. Cl............................................... B60t 7/12
[58] Field of Search.................... 180/101; 188/109; 303/19

[56] References Cited
UNITED STATES PATENTS
3,259,203  7/1966  Ryskamp ....................... 188/109 X
3,664,454  5/1972  Cottrell........................... 188/109 X FOREIGN PATENTS OR APPLICATIONS
693,792  9/1930  France................................ 188/109

Primary Examiner—Duane A. Reger
Attorney—Charles L. Schwab et al.

[57] ABSTRACT

The operating linkage of a dead-man seat brake includes a toggle with an in-line or centered position in the brake released position of the linkage wherein the force exerted by the rather large brake applying spring is isolated from the operator's seat. A relatively weak spring biases the seat upwardly to break the in-line position of the toggle when the operator vacates the seat.

7 Claims, 2 Drawing Figures

PATENTED JUL 31 1973 3,749,207

3,749,207

SEAT BRAKE WITH TOGGLE LINKAGE

BACKGROUND OF THE INVENTION

Heretofore others have employed dead-man seat brake mechanisms of the type wherein a brake is automatically applied upon the operator leaving the operator's seat. In those devices employing a spring operated brake, the operator's seat is subject to an upward thrust when the operator is seated. This constant upward pushing of the seat against the operator is annoying or uncomfortable and in some instances makes entering and leaving the vehicle seat inconvenient inasmuch as the seat pushes against the operator as he is trying to leave it.

BRIEF DESCRIPTION OF THE INVENTION

The dead-man seat brake of this invention includes a toggle in the brake actuating linkage whereby in the brake released position the main brake operating spring acts against the toggle link in the latter's in-line position, thus isolating the operator's seat from the force of brake operating spring. In order to break the in-line position of the toggle, a spring with relatively small force exerting capability is employed to act upwardly against the seat operating link to initially break the toggle and raise the seat slightly. Once the toggle is moved from its in-line position, the main brake actuating spring engages the brake and moves the seat to its raised position.

BRIEF DESCRIPTION OF THE DRAWINGS

Referring to the one sheet of patent application drawings.

DETAILED DESCRIPTION OF THE INVENTION

Figure 1:
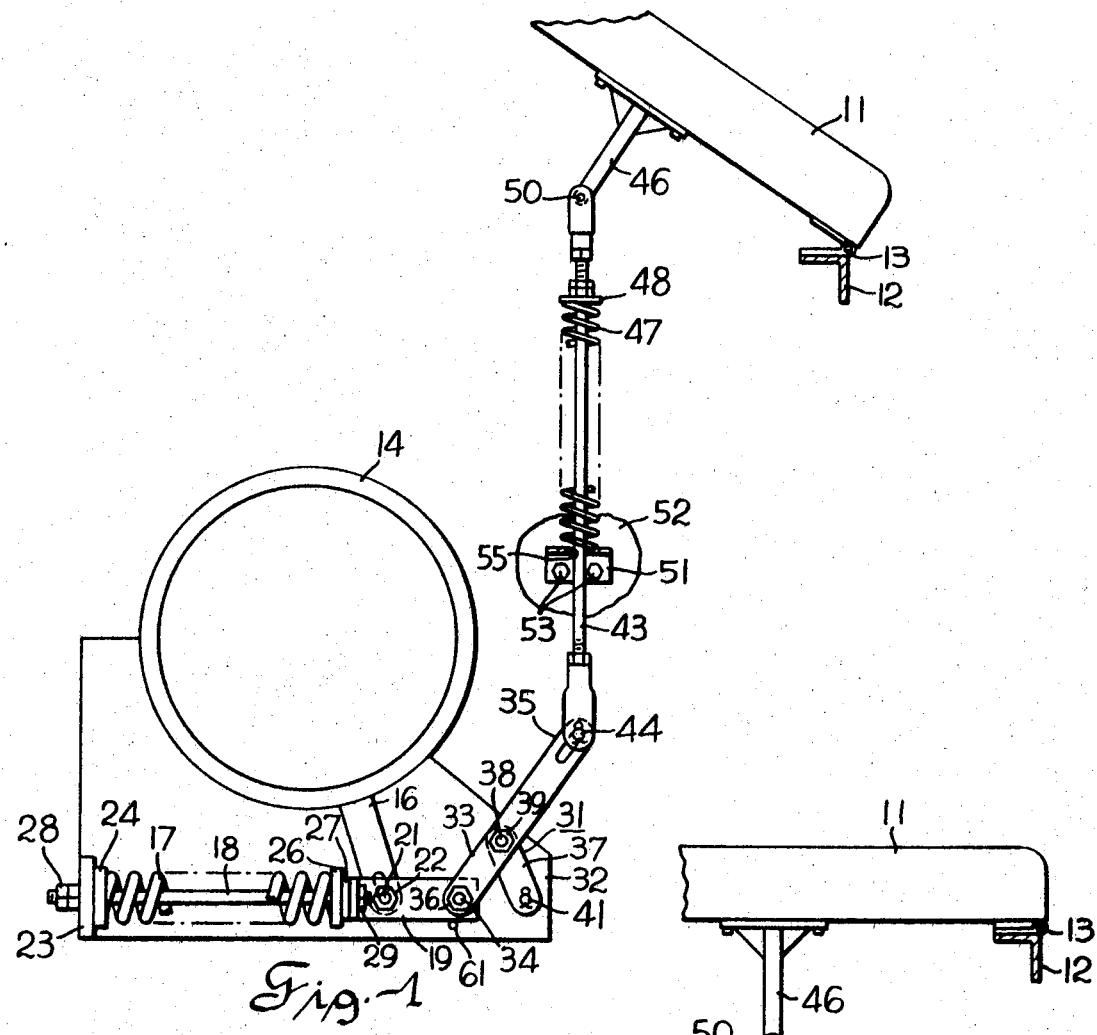
FIG. 1 shows the seat brake operating mechanism of the present invention in a side view with the operator's seat vacated.
Figure 2:
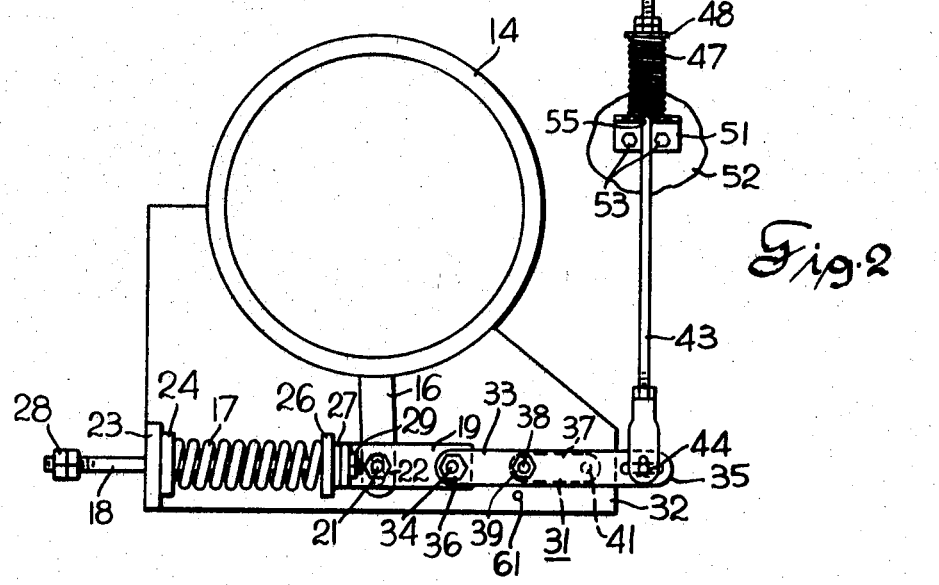
FIG. 2 shows the mechanism of FIG. 1 with the seat in an occupied position.

Referring to FIG. 1, an operator's seat 11 is mounted on the frame 12 of the vehicle on a transverse pivot axis 13. The vehicle is provided with a brake 14 operable to bring the vehicle to a standstill when applied. Application of the brake 14 is accomplished by pivoting lever 16 clockwise as shown in FIGS. 1 and 2. As shown in FIG. 1, a brake applying spring 17 is acting against the lever 16 and the brake is applied. The brake spring 17 coils around a retainer rod 18, the forward end of which is connected to link 19 which in turn is pivotally connected to the brake operating lever 16 by a pivot means which includes a bolt 21 and nut 22. The opposite ends of the rod 18 extend through suitable openings in the vehicle frame part 23 and a washer 24 at one end and through a washer 26 and a flange portion 27 of link 19 at its other end. The opposite ends of the rod 18 are threaded to receive nuts 28, 29. A toggle 31 is provided between the right end of link 19 and a fixed point on the vehicle frame part 32. The toggle 31 includes a first link 33 pivotally connected to the link 19 by a bolt 34 and nut 36 and a second link 37 pivotally connected at one end to the first link 33 by a bolt 38 and nut 39 and at its other end to a pin 41. The link 33 includes a free end portion 35 extending upwardly beyond the bolt 38 a substantial distance and is pivotally connected to force transmitting means in the form of an upstanding link or rod 43 by a pin 44. The upper end of the rod 43 is pivotally connected to a depending bracket 46 on the seat 11 by a pin 50. The link 43 is biased upwardly by a low force coil spring 47 which encompasses it. The upper end of the weak spring 47 bears against a washer 48 positioned by nut 49 on the link 43. The lower end of the seat biasing spring 47 acts against a bracket 51 secured to the frame part 52 of the vehicle by a pair of cap screws 53. The rod 43 extends through an opening 55 in the bracket 51.

OPERATION OF THE INVENTION

When the operator's seat is in the raised position as shown in FIG. 1, the brake 14 is applied, thus preventing the vehicle from moving. Upon the operator leaving the seat 11, the seat biasing spring 47 acts upwardly against the seat with sufficient force to pivot it about its transverse pivot axis 13 and the brake operating spring 17, which is of considerably greater thrust capacity than spring 47, acts against both the brake lever 16 and the rod 43 to apply the brake and assist in completing the movement of the seat 11 upwardly. When the operator returns to the vehicle and occupies the seat 11, the seat is lowered to the position shown in FIG. 2; and in this position, the seat will have moved the rod 43 downwardly a sufficient extent to cause the toggle 31 to be in a substantially in-line position, that is, in a position where the bolts 34, 38 and pin 41 are substantially in alignment. A pin 61 on frame part 32 is in confronting relation to the toggle 31 and prevents it from going substantially past its dead center or in-line position. In the in-line position of the toggle 31, the compressed spring 17 will not be capable of exerting any substantial force upwardly against rod 43, and thus, only the small downward force required to compress the small spring 17 is necessary to keep the brake inoperative. Thus, it will be apparent that the operator seat will not be subject to the uncomfortable upward thrust exerted by the main brake applying spring 17 during normal operation of the truck (at which time the operator is seated). Upon leaving the vehicle, the seat will be moved upwardly and the in-line position of the toggle 31 broken to permit the brake operating spring 17 to apply its full force to operate the brake through lever 16 and exert some upward force against the rod 43 to assist spring 17 in completing the raising of the seat 11. Thus it is seen that the spring 47 is operatively associated with the seat 11 and toggle 31 to raise the former and break the centered or in-line position of the latter whenever the seat 11 is vacated.

The embodiments of the invention in which an exclusive property or privilege is claimed are defined as follows:

1. A seat brake system for a vehicle comprising:
    a vehicle brake including
       an operating element shiftable between brake applied and brake released positions, and
       a brake actuating spring operable to move said element to its brake applied position,
    a vertically movable seat shiftable between raised and lowered positions, and
    a linkage interconnecting said seat and lever including
       a toggle having pivotally interconnected links shiftable from a relatively angularly disposed position in which said brake lever is in its brake applied position to a substantially in-line position in which said lever is in its brake released position and the force of said brake actuating spring is substantially isolated from said seat, force transmitting means between said seat and said toggle operable to shift said toggle from its angularly disposed position to its in-line position upon said seat shifting from its raised position to its lowered position, and spring means operatively associated with said seat and toggle to move said seat upwardly from its lowered position and said toggle out of its in-line position when said seat is vacated.

2. The structure of claim 1 and further comprising means preventing said toggle from being moved substantially past its in-line position when it is moved from its angular position to its in-line position.

3. The structure of claim 1 wherein said force transmitting means includes a force transmitting link interconnecting said seat and toggle.

4. The structure of claim 3 wherein said spring means acts against said member to bias said seat toward its raised position.

5. The structure of claim 4 and further comprising means preventing said toggle from being moved substantially past its in-line position when it is moved from its angular position to its in-line position.

6. The structure of claim 1 wherein one of said links of said toggle includes a free end portion extending a substantial distance from the interconnection between said links and wherein said force transmitting means is connected to said free end.

7. The structure of claim 1 wherein said force transmitting means includes an upstanding link and said spring means urges said link in a direction to effect raising said seat.

* * * * *